(12) United States Patent
Hikita et al.

(10) Patent No.: US 6,228,972 B1
(45) Date of Patent: May 8, 2001

(54) AROMATIC POLYCARBODIIMIDE AND WATER REPELLENT SHEET MADE THEREFROM

(75) Inventors: Takami Hikita; Michie Sakamoto; Sadahito Misumi; Amane Mochizuki; Takahiro Fukuoka, all of Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/421,857

(22) Filed: Oct. 20, 1999

(30) Foreign Application Priority Data

Oct. 23, 1998 (JP) .................................................. 10-302571
Jun. 29, 1999 (JP) .................................................. 11-183623
Oct. 4, 1999 (JP) .................................................. 11-282591

(51) Int. Cl.[7] .................................................. C08G 73/10
(52) U.S. Cl. .......................... 528/170; 528/176; 528/310; 528/353; 428/473.5
(58) Field of Search ..................... 528/170, 176, 528/310, 353; 428/473.5

(56) References Cited

U.S. PATENT DOCUMENTS 5,650,476 * 7/1997 Amana et al. ........................... 528/44
6,008,311 12/1999 Sakamoto et al. ..................... 528/74

FOREIGN PATENT DOCUMENTS 2-292316  3/1990  (JP) .
4-279618  5/1992  (JP) .
11-21350  1/1999  (JP) .

OTHER PUBLICATIONS

Angrew, Chem. Internat. Edit., vol. 7, No. 12, pp. 941 (1968).

\* cited by examiner

Primary Examiner—P. Hampton-Hightower
(74) Attorney, Agent, or Firm—Sughrue, Mion, Zinn, Macpeak & Seas, PLLC (57) ABSTRACT

An aromatic polycarbodiimide comprising a structure represented by the following formula (1) has high solubility in organic solvents, good processability, excellent moisture resistance, and water repellency:

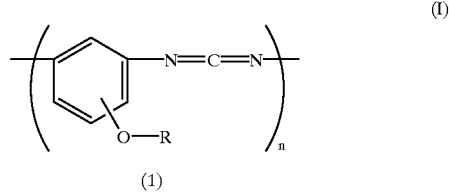

(1)

wherein n is an integer of 2 to 300, and R represents an organic group.

14 Claims, 4 Drawing Sheets

AROMATIC POLYCARBODIIMIDE AND WATER REPELLENT SHEET MADE THEREFROM

BACKGROUND OF THE INVENTION

1. Field of the Invention

The present invention relates to a novel aromatic polycarbodiimide and a water repellent sheet made therefrom. More particularly, the present invention relates to an aromatic polycarbodiimide having high heat resistance, low hygroscopicity and a low dielectric constant and to a water repellent sheet made from such an aromatic polycarbodiimide.

2. Description of the Related Art

There have been known aromatic polycarbodiimides produced by polymerizing diphenylmethane diisocyanate (MDI) or tolylene diisocyanate (TDI) as a monomer. These aromatic polycarbodiimides are used as flame resistant films or heat resistant adhesives because of their excellent heat resistance.

From the point of view that these aromatic polycarbodiimide films do not generate a volatile gas or decomposed monomer even when they are exposed to a temperature higher than 400° C., it can be said that these aromatic polycarbodiimide films have acceptable heat resistance. However, they have low moisture resistance, and loses self supporting properties and become fragile when they are heat-treated at 200° C. or more, so that they are not fit for practical use. In addition, they have poor solubility in an organic solvent and low workability.

Further, recently it is required for heat resistant films to have various properties in combination depending on their use. For example, in the case of interlayer insulating films for printed circuit boards or LSIs, low thermal expansion coefficient and low dielectric constant are expected. For components for use in optical communication, in particular cladding materials for use in optical waveguides, low refractive index is expected. Furthermore, to keep the values of physical properties constant, water absorption must be low. When heat resistant films are used as a surface protector for molded articles used under humid atmospheres or as a heat resistant releasing material, it is effective to impart water repellency thereto.

For example, polyimides, which are excellent in heat resistance and they are used widely, have a high water absorption due to the fact that they contain in their molecule many imide groups, which are highly polarized. On the other hand, in the case where they contain fluorine in the molecule, polyimides have a small contact angle, so that no sufficient water repellency can be obtained.

Water repellency can be imparted by various methods, which include methods in which fluorochemical compositions are added, methods in which fluorine atom is introduced in the polymer main chain, etc. As one of the methods in which fluorochemical compositions are added, there has been a report on the use of a carbodiimide compound as an extender (Japanese Patent Application Laid-open No. Hei 8-325220). Here, the carbodiimide compound is used as an extender for fluorochemical compounds in order to reduce costs but it does not exhibit water repellency or oil repellency when used alone.

As the polymer having introduced in the polymer main chain, there has been known polytetrafluoroethylene (PTFE), which however has a somewhat poor processability. Also, there has been known a method in which a substituent containing many trifluoromethyl groups is introduced to one or both ends of polyimide molecule. However, this method is disadvantageous from the viewpoint of costs (Japanese Patent Application Laid-open No. Hei 11-21350).

SUMMARY OF THE INVENTION

The inventors of the present invention have conducted intensive studies on various raw material monomers and aromatic polycarbodiimide to obviate the above defects of the conventional polycarbodiimides. As a result, they have found that the above problems can be solved by a polycarbodiimide having the following new skeleton and accomplished the present invention based on this finding.

1) In a first aspect, the present invention provides an aromatic polycarbodiimide comprising a structure represented by the following formula (I):

(I)

wherein n is an integer of 2 to 300, and R represents an organic group.

The polymer, which is a novel polymer compound, has excellent solubility in organic solvents and at the same time very high heat resistance, and also it is excellent in adhesion, low temperature processability and moisture resistance. Furthermore, it can readily be dissolved in organic solvent solutions to give polycarbodiimide solutions, from which water repellent sheet can be produced. The polycarbodiimide has high heat resistance similar to that of polyimides but they have no polar groups in the molecule so that it has low water absorption and gives high water repellency as compared with polyimides.

In relation to the polycarbodiimide of the present invention, reference is made to Japanese Patent Application Laid-open Nos. Hei 2-292316 and Hei 4-279618, which disclose aromatic polycarbodiimides represented by the following formula (II):

(II)

wherein $R_1$ is a lower alkyl group such as a methyl group or a lower alkoxy group such as methoxy group. The polycarbodiimides are poor in durability. Heretofore, no report has been made on polycarbodiimide to which an organic group having a large number of carbon atoms or an organic group containing fluorine atoms is introduced in its side chain through an ether bond.

Other objects and advantages of the present invention will become apparent from the detailed description to follow taken in conjunction with the appended claims.

DETAILED DESCRIPTION OF THE PREFERRED EMBODIMENTS

An aromatic polycarbodiimide containing a structure represented by the formula (I) of the present invention can be obtained by polymerizing a diisocyanate represented by the following formula (III) as a monomer in the presence of a phosphorus-based catalyst in accordance with a known polymerization method.

(III)

In the above formula, R is an organic group, for example, an aliphatic group, a fluorine containing aliphatic group, an aromatic group, etc. Among these, an aliphatic group and a fluorine containing aliphatic group are particularly preferred. The aliphatic group includes stable, non-polar aliphatic groups, preferably saturated monovalent aliphatic groups, which may be linear, branched or cyclic or combinations thereof. Therefore, specific examples of the aliphatic group which can be preferably used in the present invention include the following groups:

-continued

R is preferably an alkyl group having 3 or more carbon atoms or a fluorinated alkyl group. When R is an alkyl group, it is particularly preferred that the alkyl group have 3 to 20 carbon atoms. The alkyl group having less than 3 carbon atoms is unsuitable since the effect of exhibiting water repellency on the surface of polycarbodiimide decreases. If the alkyl group has more than 20 carbon atoms, the heat resistance of the polycarbodiimide decreases.

The term "fluorine containing aliphatic group" means a group obtained by substituting a portion of hydrogen atoms in one of the aliphatic groups by a fluorine atom. The fluorine content of the fluorine containing aliphatic group is 10 to 80% by weight, preferably 50 to 70% by weight, based on the fluorine containing aliphatic group represented by R. If the fluorine content is above 90% by weight, there is the possibility that the polycarbodiimide will not be dissolved in ordinary organic solvents. Typical examples of the fluorine containing aliphatic group which can be preferably used in the present invention include the following groups:

—$CH_2(CF_2)_2CF_3$,
—$CH_2CH_2(CF_2)_7CF_3$,
—$(CH_2)_3(CF_2)_5CF_3$,
—$(CH_2)_6(CF_2)_5CF_3$,
—$CH_2CH_2(CF_2)_4CF(CF_3)CF_3$,
—$(CF_2)_4CF(CF_3)CF_3$,
—$CH_2(CF_2)_5CF_3$,
—$CH_2CF_2CHFCF_3$,
—$CH(CF_3)_2$,
—$CH_2CFH_2$,
—$CH_2(CH_3)C(CF_3)_2$,
—$CH_2(CF_2)_3CHF_2$,
—$CH_2(CF_2)_5CHF_2$,
—$CH_2CF_2CHF_2$,
—$CH_2(CF_2)_7CHF_2$, (Preparation of polycarbodiimide from diisocyanate)

To prepare the aromatic polycarbodiimide containing the structure represented by the formula (I), a diisocyanate monomer represented by the formula (III) may be polymerized alone or may be copolymerized with other organic diisocyanate such as 4,4'-diphenylmethane diisocyanate, 2,6-tolylene diisocyanate, 2,4-tolylene diisocyanate, 1-methoxyphenyl-2,4-diisocyanate, 3,3'-dimethoxy-4,4'-diphenylmethane diisocyanate, 4,4'-diphenylether diisocyanate, 3,3'-dimethyl-4,4'-diphenylether diisocyanate, o-tolylene diisocyanate, 2,2-bis[4-(4-isocyanatophenoxy)phenyl]-hexafluoropropane, 2,2-bis[4-(4-isocyanatophenoxy)phenyl]-propane or the like so long as the characteristics of the aromatic polycarbodiimide of the present invention are not impaired.

The copolymerization proportion of the organic diisocyanates used as comonomer(s) is preferably 1 to 90 mol %, more preferably 1 to 70 mol %, most preferably 1 to 50 mol % based on the diisocyanate monomer represented by the formula (III). When the copolymerization proportion is larger than 90 mol %, the characteristics such as water repellency of the polycarbodiimide of the present invention may be lost. One or more other polycarbodiimides may be mixed in the form of varnish in a ratio of 1/100 to 100/1 to the aromatic polycarbodiimide of the present invention.

The polymerization temperature is preferably 40 to 150° C., more preferably 50 to 140° C. When the polymerization temperature is lower than 40° C., the reaction time becomes too long, which is not practical. When the polymerization temperature is higher than 150° C., it is difficult to select a suitable solvent.

The concentration of the diisocyanate monomer for the synthesis of a polycarbodiimide is 5 to 70 wt %, preferably 15 to 70 wt %. When the concentration of the monomer is lower than 5 wt %, carbodiimidization may not proceed. When the concentration of the monomer is higher than 70 wt %, it may be difficult to control the reaction.

The organic solvent used for the synthesis of a polycarbodiimide and the organic solvent used in a polycarbodiimide solution may be a known solvent. Illustrative examples of the solvents include halogenated hydrocarbons such as tetrachloroethylene, 1,2-dichloroethane, chloroform, dichloromethane, fluorofuran, fluoroxylene; ketone-based solvents such as acetone, methyl ethyl ketone, methyl isobutyl ketone and cyclohexanone; cyclic ether-based solvents such as tetrahydrofuran and dioxane; and aromatic hydrocarbon-based solvents such as toluene, xylene, and ethylbenzene. They may be used alone or mixture of two or more.

A known phosphorus-based catalyst is used as the catalyst used for the carbodiimidization, as exemplified by phospholene oxides such as 1-phenyl-2-phospholene-1-oxide, 3-methyl-2-phospholene-1-oxide, 1-ethyl-2-phospholene-1-oxide, 3-methyl-1-phenyl-2-phospholene-1-oxide or 3-phospholene isomers thereof.

At any one of the end stage, middle stage or initial stage of a polymerization reaction, or throughout the polymerization reaction, a monoisocyanate may be added to carry out an end-capping treatment. Illustrative examples of the monoisocyanate include phenyl isocyanate, p-nitrophenyl isocyanate, p-tolyl isocyanate, p-formylphenyl isocyanate, p-isopropylphenyl isocyanate, p-trifluoromethylphenyl isocyanate, p-methoxyphenyl isocyanate, p-phenoxyphenyl isocyanate, p-chlorophenyl isocyanate, and isomers having a substituent at the ortho-positions thereof, or isomers having a substituent at the meta-positions thereof, 1-naphthyl isocyanate, 2-naphthyl isocyanate, and other aromatic isocyanates. The thus obtained polycarbodiimide solution has excellent storage stability.

After completion of the reaction, the reaction mixture may be injected into a poor solvent such as methanol, ethanol, hexane, heptane, pentane or isopropyl alcohol to deposit a polycarbodiimide as a precipitate and remove an unreacted monomer and a solvent. To prepare a polycarbodiimide solution, the polymer deposited as a precipitate is washed and dried by predetermined operation and dissolved in an organic solvent again. The stability of the polycarbodiimide solution can be improved by carrying out this operation.

The obtained polymer may be purified by adsorbing a by-product contained in the polymer solution to an appropriate adsorbent. Illustrative examples of the adsorbent include alumina gel, silica gel, activated carbon, zeolite, active magnesium oxide, active bauxite, fuller's earth, activated china clay, molecular sieving carbon and the like. They may be used alone or in combination thereof.

The polycarbodiimide of the present invention is a polycarbodiimide of the formula (I) in which n is an integer of 2 to 300, preferably 4 to 100. When the polymerization degree, n, of the polycarbodiimide is larger than 300, it is readily gelled in several minutes to several hours while it is left to stand at normal temperature, which is not preferred for practical application. When the polymerization degree n is less than 2, the coating film lacks reliability, which is not preferable.

(Monomer)

A method for preparing the monomers for the polycarbodiimide of the present invention will be described below. The diisocyanate compound represented by the formula (III) above, which is a starting compound of the polycarbodiimide of the present invention, can be prepared by diisocyanating an etherified diamine represented by the formula (IV)

(IV)

wherein R is the same organic group as defined above, which is a precursor of the diisocyanate compound represented by the formula (III).

(Preparation of diisocyanate from diamine)

To obtain a diisocyanate from a diamine, there can be used, for example, a method in which phosgene, diphenyl carbonate or carbonyl diimidazole is allowed to react with a diamine or a method in which a diisocyanate is synthesized from a dicarboxylic acid by the Curtius rearrangement. Alternative methods include a method in which a halogenated alkyl formate or halogenated aryl formate is caused to act on a diamine compound to synthesize a dicarbamate and the dicarbamate is then diisocyanated by thermal decomposition using silicon halogenide such as chlorosilane as an activating agent (G. Greber. et al., Angew. Chem. Int. Ed., Vol. 17, No. 12, 941 (1968)) or catechol borane (V. L. K. Valli. et al., J. Org. Chem., Vol. 60, 257 (1995)). They are preferred from the viewpoints of yield and safety. Upon synthesizing the carbamate, the diamine may be allowed to react with a halogenated alkyl formate or a halogenated aryl formate directly in the presence of a tertiary amine or the diamine may be activated into a silylated diamine before it can be allowed to react with a halogenated alkyl formate or a halogenated aryl formate.

(Synthesis of diamine having a side chain group)

The synthesis of the above diamine is carried out by a method including the steps of allowing an alcohol to act on 1-fluoro-2,4-dinitrobenzene as a starting material to substitute fluorine atom by an alkoxy group and then reducing the substituted product with tin (II) chloride dihydrate in the presence of an acid to synthesize an etherified diamine.

By diisocyanating the diamine thus synthesized by the above-described method, the diisocyanate compound represented by the formula (III) above as a monomer is obtained.

The above carbamation, diisocyanation and carbodiimidization of the diamine may be performed stepwise by carrying out isolation and purification in each step or continuously in a same reactor as a series of reactions.

(Production of film and adhesive sheet)

The polycarbodiimide film (or sheet) of the present invention is obtained by forming polycarbodiimide varnish into a film having an appropriate thickness in accordance with a known method (such as casting, spin coating, roll coating or the like). This film may be dried usually at a temperature required to remove the solvent. To ensure that a curing reaction does not proceed so far, the coating temperature is, for example, 20 to 350° C., preferably 50 to 300° C. When the drying temperature is lower than 20° C., the solvent remains in the film with the result that the obtained film has poor reliability, which is not preferable. When the drying temperature is higher than 350° C., the heat curing of the film readily proceeds, which is not preferable.

The polycarbodiimide resin composition of the present invention may contain fine inorganic filler in amounts within the range where its workability and heat resistance may not be impaired. Various kinds of additives such as a smoothing agent, leveling agent and defoaming agent may be added as required to provide surface smoothness.

A film formed molded article molded from the aromatic polycarbodiimide of the present invention may be used as a heat resistant adhesive sheet. The thickness of film or adhesive sheet molded from the aromatic polycarbodiimide is generally 1 to 200 $\mu$m but is not limited to this range and may be suitably selected according to the purpose. The shape and size of a sheet may be suitably determined according to an adherend such as a lead frame or semiconductor chip.

When an adhesive sheet is to be produced, at least one selected from metals such as aluminum, copper, silver, gold, nickel, chromium, lead, tin, zinc, palladium and solder, or alloys thereof, ceramics such as alumina, silica, magnesia and silicon nitride, and various carbon inorganic powders may be blended optionally to provide conductivity, improve heat conductivity and control elastic modulus, especially to increase elastic modulus.

Further, the film may be formed on a substrate film to produce an adhesive sheet. To produce such an adhesive sheet, the substrate film may be coated with varnish and be dried, or a polycarbodiimide film is formed and laminated with a substrate film by pressing.

The substrate film used herein is a metal foil or insulating film. The metal foil may be a foil of aluminum, copper, silver, gold, nickel, indium, chromium, lead, tin, zinc, palladium or the like. They may be used alone or as an alloy. Any film of a polyimide, polyester or polyethylene terephthalate may be used as the insulating film if it has heat resistance and chemical resistance.

The metal foil and the insulating film may be used alone or laminated together into a double-layer substrate, for example a metal foil/insulating film. This double-layer substrate is, for example, a copper/polyimide double-layer substrate.

The sheet adhesive of the present invention exhibits strong adhesive force and becomes a cured product having low hygroscopicity when it is cured by a heat treatment. To carry out the heat treatment, a suitable means such as a heater, ultrasonic wave or ultraviolet radiation may be used. Therefore, the adhesive sheet of the present invention is preferably used in the adhesion treatment of various materials. Particularly, the adhesive sheet of the present invention is preferably used in the fixing treatment of electric and electronic parts typified by semiconductor chips and lead frames, which require highly reliable fixing treatment and hence, must have low hygroscopicity. The adhesive sheet of the present invention is excellent in such points that it has low hygroscopicity, high flexibility which makes handling easy, excellent adhesion to a semiconductor device, and high storage stability. In particular, polycarbodiimide having as a side chain a long chain alkyl ether group or a long chain fluorinated alkyl ether froup has low elastic modulus as compared with polycarbodiimide having no side chain or having as a side chain a lower alkyl group and an improvement in adhesion is expected The polycarbodiimide resins synthesized according the above method can be used as an adhesive for electronic parts making use of its heat resistance.

(Water Repellent Sheet)

To produce the water repellent sheet of the present invention, a method in which varnish made from the aromatic polycarbodiimide of the present invention is coated and dried on a surface of a sheet-like substrate or a method in which a sheet-like substrate and a sheet-like molded article of the aromatic polycarbodiimide of the present invention are laminated one on another may be used as in the case of the production of adhesive sheets. The method of lamination is not limited particularly. For example, lamination methods in which the aromatic polycarbodiimide is applied to a substrate utilizing heat or pressure are generally used. In this case, an adhesive layer may be provided between the substrate and the polycarbodiimide layer.

The substrate for use in water repellent sheet includes a metal foil, a resin film, etc. The metal foil includes copper foil, stainless steel foil, aluminum foil, iron-nickel alloy foil, etc. The resin film includes those made from silicone polymers, olefin polymers, acrylic polymers, polyethersulfone polymers, epoxy resins, polyurethane resins, polyimide resins, polycarbonate resins, etc. These substrates may be used alone or two or more layers may be laminated one on another.

The aromatic polycarbodiimide of the present invention may be coated on a surface of substrate of a molded article to impart water repellency to the molded article. Specific examples of the substrate include various materials, e.g., inorganic materials such as metals, concrete, and ceramics, organic materials such as wood and plastics. The shape of the substrate is not limited particularly and includes various shapes such as plate, rod, column, prism, cone, sphere, and spheroid.

The coating may be carried out by a method in which varnish made from the aromatic polycarbodiimide of the present invention is coated or sprayed onto a surface of a substrate and then dried, a method in which a substrate is covered with a sheet of the aromatic polycarbodiimide and then the sheet is closely bonded to the substrate by a hot press, or the like method.

EXAMPLES

The following examples and comparative examples are given to further illustrate the present invention. All the reactions were carried out in a nitrogen atmosphere. The characteristics of the obtained aromatic polycarbodiimides and sheets (films) prepared therefrom were measured as follows.

(IR)

Measured using an infrared spectrophotometer (trade name: FT/IR-230, manufactured by JEOL Ltd.).

(Heat curing temperature (Tc))

Measured using a differential scanning calorimeter (trade name: DSC-200, manufactured by Seiko Instruments, Inc.) and the exothermic peak of trimerization is taken as heat curing temperature.

(Heat decomposition temperature (Td))

Measured using a thermal balance (trade name: TG/DTA 300, manufactured by Seiko Instruments, Inc.) and the temperature at which a reduction in weight by 5% by weight has occurred is defined as Td.

(Number average molecular weight)

Measured using a gel permeation chromatograph (trade name: HLC 8120, manufactured by Tosoh Corporation), a column (trade name: $GMH_{HR-H}+GMH_{HR-H}+G2000H_{HR}$, manufactured by Tosoh Corporation), tetrahydrofuran as a developing solvent and polystyrene as a standard substance.

(Adhesive strength)

Peel strength at 180° was measured by grasping a copper foil and a 42 alloy plate and separating them at room temperature using a tensile tester (trade name: Shimadzu Autograph AGS-100D, manufactured by Shimadzu Corporation).

(Dielectric constant)

Gold was vapor deposited on a film prepared by curing at 200° C. for 60 minutes in the form of a thin disk of 2 cm in diameter on one surface and all over the other surface and electrodes were attached to the respective surfaces. Dielectric constant was measured using Precision LCR Meter HP 4284A (trade name, manufactured by Hewlett Packard Inc.)

(Elastic modulus (E'))

Measured at room temperature using a dynamic viscosity measuring apparatus (trade name: DMS100, manufactured by Seiko Instruments, Inc.).

(Contact angle)

Measured at room temperature using a contact angle meter CA-X type (manufactured by Kyowa Kaimen Kagaku Co., Ltd.). For the measurement, distilled water was used.

(Glass transition temperature (Tg))

Measured using a thermomechanical analyzer (trade name: TMA/SS100, manufactured by Seiko Instruments, Inc.).

(Evaluation of water absorption)

Each film was prepared by drying at 150° C. for 30 minutes and then the film was cut to a section of 40 mm in width and 40 mm in length and the weight (Wa) thereof was measured. Thereafter, the film sections were left to stand in an atmosphere of 85° C. and 85% RH (relative humidity) for 168 hours and were measured for the weight after water absorption (Wb) by Karl Fisher's titration using an evaporating apparatus (trade name:EV-5, manufactured by Hiranuma sangyo k.k.) and a titration apparatus (trade name: AQ-5 HIRANUMA AQUACOUNTER). Then, water absorption (%) was calculated by the following equation.

Water absorption (%)=[Wa/Wa]×100

(Evaluation of flexibility)

Film was heat-treated at 250° C. for 1 hour and the flexibility of the film after the treatment was evaluated by the following criteria:

o: The film was flexible.

X: The film was not flexible.

Example 1

Preparation of Diamine

In a flask were charged 1-fluoro-2,4-dinitrobenzene (40.94 g, 0.22 mol), triethylamine (24.29 g, 0.24 mol), 3,3,4,4,5,5,6,6,7,7,8,8,9,9,10,10,10-heptadecafluorodecyl alcohol (102.1 g, 0.22 mol), 220 g of N,N-dimethylacetamide and stirred at room temperature for 22 hours under a nitrogen atmosphere. The resultant etherified product was introduced into water with stirring. The solids precipitated were collected and dried at 40° C. under reduced pressure to obtain 97.22 g (yield: 72%) of 4-(3,3,4,4,5,5,6,6,7,7,8,8,9,9,10,10,10-heptadecafluorodecyloxy)-1,3-dinitrobenzene as yellow crystals.

In a 1 liter three-neck flask were charged the above dinitro compound (33.02 g, 52.4 mmol), 35% hydrochloric acid (163.90 g, 1.57 mol), acetic acid (46.25 g, 0.77 mol), and tin chloride (81.22 g, 0.36 mol) and stirred at room temperature for 1 hour. Thereafter, the temperature was elevated to 100° C. and the mixture was stirred for 10 hours. After cooling the reaction mixture to room temperature, it was neutralized with an aqueous 20 wt % NaOH solution and extracted with ethyl acetate (2 liters). The organic phase was dried over anhydrous magnesium sulfate and the solvent was distilled of to obtain crude product. The crude product was purified by column chromatography to obtain 20.9 g (yield: 70%) of 4-(3,3,4,4,5,5,6,6,7,7,8,8,9,9,10,10,10-heptadecafluorodecyloxy)-1,3-benzenediamine represented by the formula (5) as russet crystals.

(V)

Polycarbodiimidization of Diamine

In a 200 ml three-neck flask equipped with a dropping funnel were charged 4-(3,3,4,4,5,5,6,6,7,7,8,8,9,9,10,10,10-heptadecafluorodecyloxy)-1,3-benzenediamine (10.00 g, 17.5 mmol), triethylamine (3.55 g, 3.1 mmol), trimethylchlorosilane (3.81 g, 35.1 mmol), and 51 g of toluene, and stirred at 80° C. for 3 hours under nitrogen atmosphere.

After cooling to room temperature, phenyl chloroformate (5.49 g, 35.1 mmol) was charged in the dropping funnel and dropped down over 30 minutes in a water bath, followed by stirring at room temperature over night. The resulting triethylamine hydrochloride was removed by washing and the obtained dicarbamate compound was extracted with ethyl acetate. The organic phase was dried over anhydrous magnesium sulfate and concentrated under reduced pressure. The concentrate was introduced in n-hexane while stirring. The solids precipitated were collected and dried at 40° C. under reduced pressure to obtain 11.40 g (yield: 81%) of 4-(3,3,4,4,5,5,6,6,7,7,8,8,9,9,10,10,10-heptadecafluorodecyloxy)-1,3-phenylenebis(phenyl carbamate) as reddish brown crystals.

Figure 1:
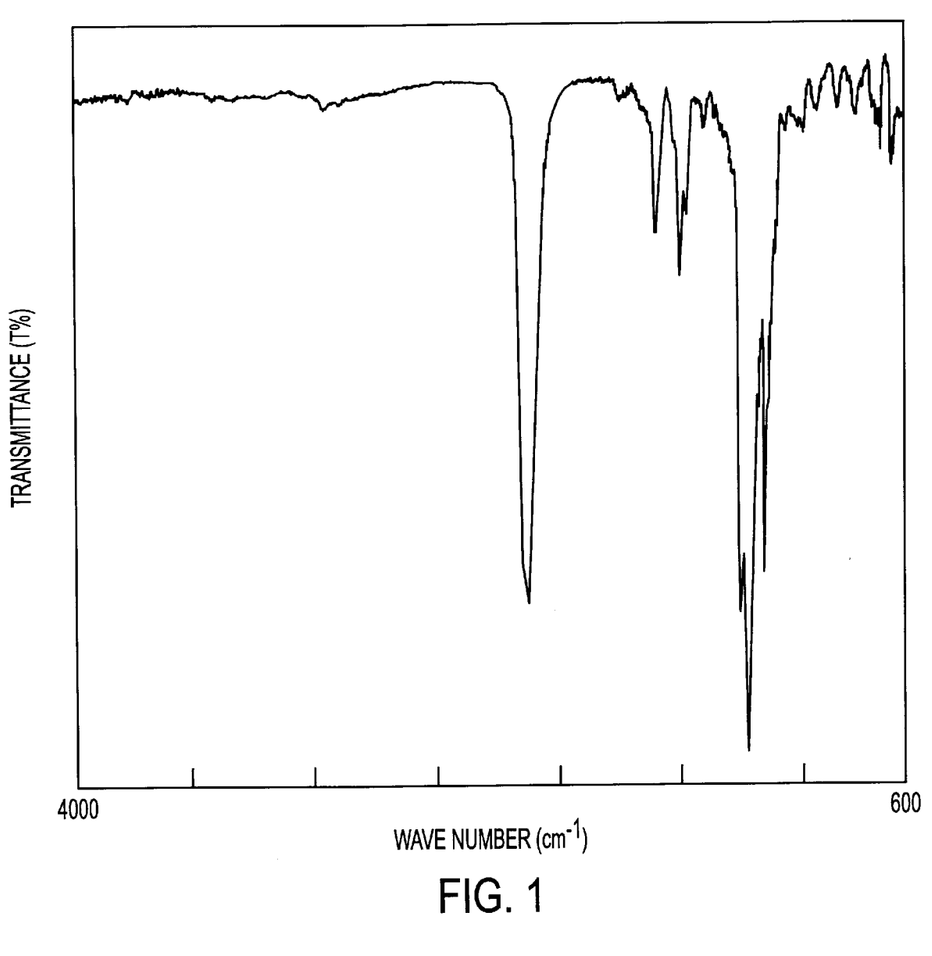
FIG. 1 is a chart illustrating an infrared absorption spectrum of an aromatic polycarbodiimide obtained in Example 1.

Subsequently, in a three-neck flask were charged (11.43 g, 14.1 mmol) of 4-(3,3,4,4,5,5,6,6,7,7,8,8,9,9,10,10,10-heptadecafluorodecyloxy)-1,3-phenylenebis(phenyl carbamate), triethylamine (2.95 g, 28.2 mmol), trimethylchlorosilane (3.06 g, 28.2 mmol), a carbodiimidization catalyst (3-methyl-1-phenyl-2-phospholene-1-oxide) (0.14 g, 0.7 mmol), 53 g of THF and refluxed for 5 hours under nitrogen atmosphere to perform diisocyanation and polymerization, followed by addition of 4-isopropylphenyl isocyanate (0.68 g, 4.2 mmol) and refluxing for 3 hours. Carbodiimidization was confirmed from an IR spectrum shown in FIG. 1 and the formed triethylamine hydrochloride was removed by filtration to obtain brown varnish. The varnish was introduced into n-hexane with stirring. The precipitated polymer was collected and dried to obtain 7.00 g (yield: 86%) of polycarbodiimide as reddish brown powder.

Then, the polycarbodiimide was redissolved in THF to prepare 35 wt % base varnish. The storage stability of the above varnish was 30 days or more at room temperature. The varnish was cast onto a glass plate and dried at 200° C. for 30 minutes to obtain a film with good properties of Tg=161° C., Tc=350° C., and Td=301° C. The number average molecular weight (Mn) of the polycarbodiimide was 5,600 (n=10).

Example 2

Preparation of Diamine

In a 1 liter flask were charged 1-fluoro-2,4-dinitrobenzene (40.94 g, 0.22 mol), triethylamine (24.29 g, 0.24 mol), 1-decanol (34.82 g, 0.22 mol), 220 g of N,N-dimethylacetamide and stirred at room temperature for 24 hours under a nitrogen atmosphere. The resultant etherified product was extracted with 1 liter of ethyl acetate. The organic phase was dried over anhydrous magnesium sulfate and the solvent was distilled off to obtain crude product. Isolation and purification of the target product by silica gel chromatography afforded 57.80 g (yield: 81%) of 4-decyloxy-1,3-dinitrobenzene as yellow crystals.

In a 2 liter three-neck flask were charged the above dinitro compound (64.88 g, 0.20 mol), 35% hydrochloric acid (597.96 g, 6.06 mol), acetic acid (182.21 g, 3.03 mol), and tin chloride (318.14 g, 1.41 mol) and stirred at room temperature for 2 hours. Thereafter, the temperature was elevated to 100° C. and the mixture was stirred for 9 hours. After cooling the reaction mixture to room temperature, it was neutralized with an aqueous 20 wt % NaOH solution and extracted with ethyl acetate (2 liters). The organic phase was dried over anhydrous magnesium sulfate and the solvent was distilled of to obtain crude product. The crude product was purified by column chromatography to obtain 59.70 g (yield: 75%) of 4-decyloxy-1,3-benzenediamine as brown crystals.

Polycarbodiimidization of Diamine

In a three-neck flask equipped with a dropping funnel were charged the above 4-decyloxy-1,3-benzenediamine (10.00 g, 37.8 mmol), triethylamine (7.65 g, 75.6 mmol), trimethylchlorosilane (8.23 g, 75.6 mmol), and 109 g of toluene, and stirred at 80° C. for 3 hours under nitrogen atmosphere to obtain silylated diamine.

After cooling to room temperature, phenyl chloroformate (11.87 g, 75.6 mmol) was charged in a dropping funnel and dropped down over 30 minutes in a water bath, followed by stirring at room temperature over night. The resulting triethylamine hydrochloride was removed by washing and the obtained dicarbamate compound was extracted with ethyl acetate. The organic phase was dried over anhydrous magnesium sulfate and the solvent was distilled off under reduced pressure to obtain 11.40 g (yield: 96%) of 4-decyloxy-1,3-phenylenebis(phenyl carbamate) as brown crystals.

Figure 2:
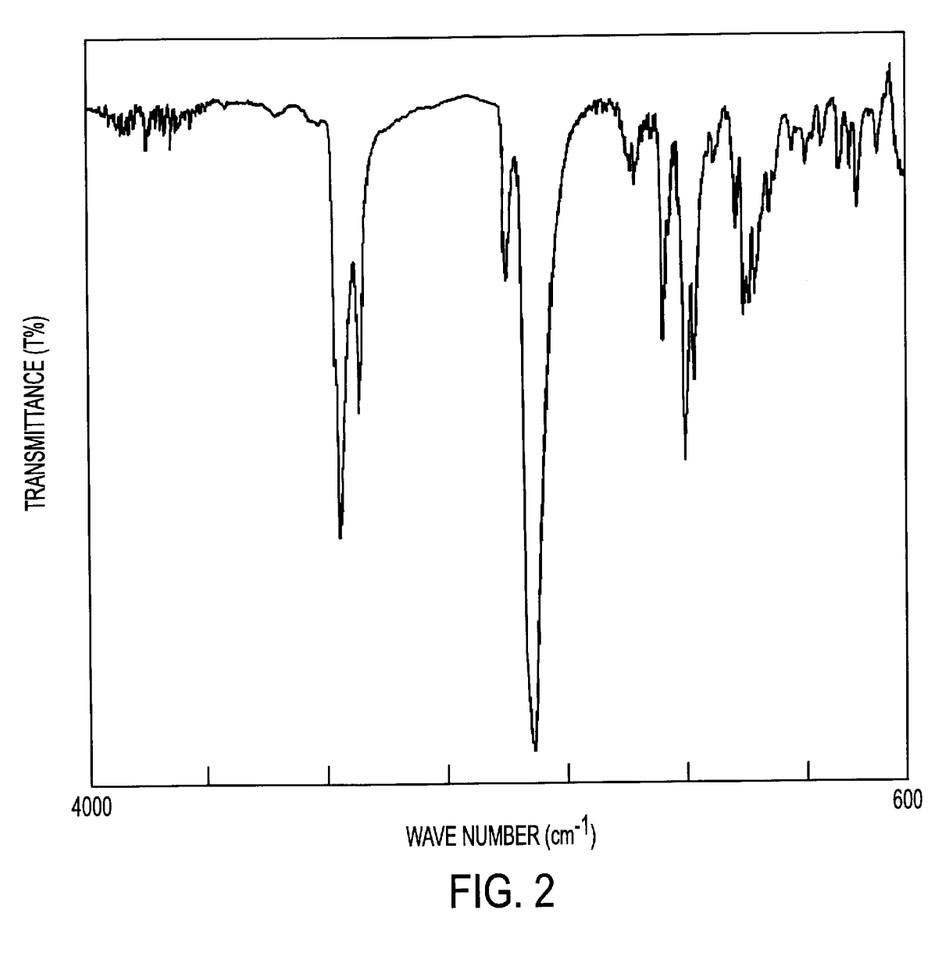
FIG. 2 is a chart illustrating an infrared absorption spectrum of an aromatic polycarbodiimide obtained in Example 2.

Subsequently, in a three-neck flask were charged (10.00 g, 19.8 mmol) of 4-decyloxy-1,3-phenylenebis(phenyl carbamate), triethylamine (4.00 g, 39.6 mmol), trimethylchlorosilane (4.30 g, 39.6 mmol), a carbodiimidization catalyst (3-methyl-1-phenyl-2-phospholene-1-oxide) (0.19 g, 1.0 mmol), 57 g of toluene and stirred at 80° C. for 8 hours under nitrogen atmosphere to perform diisocyanation and polymerization, followed by addition of 4-isopropylphenyl isocyanate (1.60 g, 9.9 mmol) and stirred at 80° C. for 2 hours. Carbodiimidization was confirmed from an IR spectrum shown in FIG. 2 and the formed triethylamine hydrochloride was removed by filtration to obtain brown varnish. The varnish was introduced into isopropyl alcohol with stirring. The precipitated polymer was collected and dried to obtain 3.91 g (yield: 72%) of polycarbodiimide as brown viscous solids.

Then, the polycarbodiimide was redissolved in toluene to prepare 50 wt % base varnish. The storage stability of the above varnish was 30 days or more at room temperature. The varnish was cast onto a glass plate and dried at 200° C. for 30 minutes to obtain a film with good properties of Tg=123° C., Tc=378° C., and Td=297° C. The number average molecular weight (Mn) of the polycarbodiimide was 2,700 (n=10).

Comparative Example 1

12.02 g (69.01 mmol) of 2,4-tolylene diisocyanate was stirred in 89 g of tetrahydrofuran together with 0.248 g (1.29 mmol) of a carbodiimidization catalyst (3-methyl-1-phenyl-2-phospholene-1-oxide) at 60° C. for 4 hours and then 4-isopropylphenyl isocyanate (2.23 g, 13.83 mmol) was added thereto and the mixture was further stirred at 68° C. for 2 hours. Carbodiimidization was confirmed from an IR spectrum. This solution was introduced into n-hexane and the precipitated polymer was collected and dried to obtain 7.55 g (yield: 84%) of polycarbodiimide as white crystals. The number average molecular weight of this polycarbodiimide was 6,700 (n=52).

This polymer solution was cast onto a glass plate and dried at 200° C. for 30 minutes to produce a 17 μm-thick film with properties of Tc=347° C., Tg=150° C., and Td=426° C. When this film was further heated at 250° C. for 1 hour, it changed its color and lost flexibility.

Example 3

The varnish produced in Example 1 was coated on a 105 μm-thick copper foil and dried at 90° C. for 10 minutes and then at 250° C. for 10 minutes to obtain an adhesive sheet having an adhesive layer of 10 μm in thickness. The adhesive layer surface of this adhesive sheet was bonded onto a 42 alloy plate (Ni:Fe et al.=40.0–43.0:60.0–57.0 alloy plate, trade name: NAS 42, manufactured by Nippon Yakin Kogyo K.K.) and pressed at a temperature of 300° C. and a pressure of 50 kg/cm² for 1 second to obtain a laminate sheet. When the adhesive strength of this laminate sheet bonded onto the substrate was measured, it exhibited a peel strength of 1,000 g/cm. When the solder resistance of this laminate sheet comprising the substrate was tested (260° C.×10 sec), it showed good adhesion without swelling. The adhesive layer had a glass transition temperature Tg of 142° C., an elastic modulus E' at room temperature of 0.24 GPa, and a water absorption of 0.1%.

Example 4

The films obtained in Examples 1 and 2 and Comparative Example 1 were measured for dielectric constant and elastic modulus. Dielectric constant at 1 MHz and elastic modulus at room temperature of each film were as shown in Table 1.

TABLE 1

|  | Elastic Modulus (GPa) | Dielectric Constant |
| --- | --- | --- |
| Example 1 | 0.36 | 2.74 |
| Example 2 | 0.11 | 3.11 |
| Comparative Example 1 | 1.22 | 3.30 |

Example 5

In a four-neck flask equipped with a stirrer, a dropping funnel, and a reflux condenser and a thermometer were charged the compound of the formula (V) produced in Example 1 (10.0 g, 17.5 mmol), triethylamine (3.55 g, 35.1 mmol), trimethylchlorosilane (3.81 g, 35.1 mmol) and 52 g of THF and stirred at 80° C. for 3 hours to obtain silylated diamine. After cooling to room temperature, phenyl chloroformate (5.49 g, 35.1 mmol) was charged in the dropping funnel and dropped over about 10 minutes in a water bath and stirred at room temperature over night. After confirming the formation of carbamate from an IR spectrum, trimethylchlorosilane (1.91 g, 17.6 mmol) and triethylamine (5.32 g, 53.6 mmol) were charged and stirred at 80° C. for 3 hours to perform isocyanation. After confirming the formation of isocyanate from an IR spectrum, the reaction mixture was cooled to room temperature and a carbodiimidization catalyst (3-methyl-1-phenyl-2-phospholene-1-oxide) (0.17 g, 0.9 mmol) and a capping agent (p-isopropylphenyl isocyanate) (0.85 g, 5.26 mmol) were charged and polymerization was carried out at 80° C. for 6 hours and then at 90° C. for 2 hours.

Upon confirmation of the carbodiimidization from an IR spectrum, an absorption at 2,120 cm$^{-1}$ specific to a carbodiimide group was confirmed. The reaction solution was introduced in methanol with stirring. The resultant precipitates were recovered to obtain 8.60 g (yield: 85%) of polymer powder. This polycarbodiimide had a number average molecular weight (Mn) of 4,600 (n=8). The polycarbodiimide powder was redissolved in a fluorine-contained solvent to prepare a 30 wt % base varnish. The varnish was cast on a glass plate and dried at 90° C. for 30 minutes and then 200° C. for 60 minutes to obtain a film with Tg=187° C. The film was measured for contact angle and water absorption. The properties measured are shown in Table 2. The film remained to be a good film having a flexibility even after heat treatment at 250° C. for 1 hour.

Example 6

In a four-neck flask equipped with a stirrer, a dropping funnel, and a reflux condenser and a thermometer were charged the compound of the formula (VI)

(VI)

produced in Example 2 (10.00 g, 37.8 mmol), triethylamine (7.65 g, 75.6 mmol), trimethylchlorosilane (8.22 g, 75.6 mmol) and 100 g of toluene and stirred at 80° C. for 3 hours to obtain silylated diamine. After cooling to room temperature, phenyl chloroformate (11.84 g, 75.6 mmol) was charged in the dropping funnel and dropped over about 10 minutes in a water bath and stirred at room temperature over night. After confirming the formation of carbamate from an IR spectrum, trimethylchlorosilane (4.11 g, 37.8 mmol) and triethylamine (11.48 g, 113.5 mmol) were charged and stirred at 80° C. for 3 hours to perform isocyanation. After confirming the formation of isocyanate from an IR spectrum, the reaction mixture was cooled to room temperature and a carbodiimidization catalyst (3-methyl-1-phenyl-2-phospholene-1-oxide) (0.36 g, 1.9 mmol) and a capping agent (p-isopropylphenyl isocyanate) (1.83 g, 11.4 mmol) were charged and polymerization was carried out at 80° C. for 6 hours and then at 90° C. for 2 hours.

Upon confirmation of the carbodiimidization from an IR spectrum, an absorption at 2,120 cm$^{-1}$ specific to a carbodiimide group was confirmed. The reaction solution was introduced in methanol with stirring. The resultant precipitates were recovered to obtain 7.16 g (yield: 70%) of polymer powder. This polycarbodiimide had a number average molecular weight (Mn) of 2,700 (n=10). The polycarbodiimide powder was redissolved in a fluorine-contained solvent to prepare a 30 wt % base varnish. The varnish was cast on a glass plate and dried at 90° C. for 30 minutes and then 200° C. for 60 minutes to obtain a film with Tg=135° C. The film was measured for contact angle and water absorption. The properties measured are shown in Table 2. The film remained to be a good film having a flexibility even after heat treatment at 250° C. for 1 hour.

Example 7

A diamine represented by the formula (VII)

Figure 3:
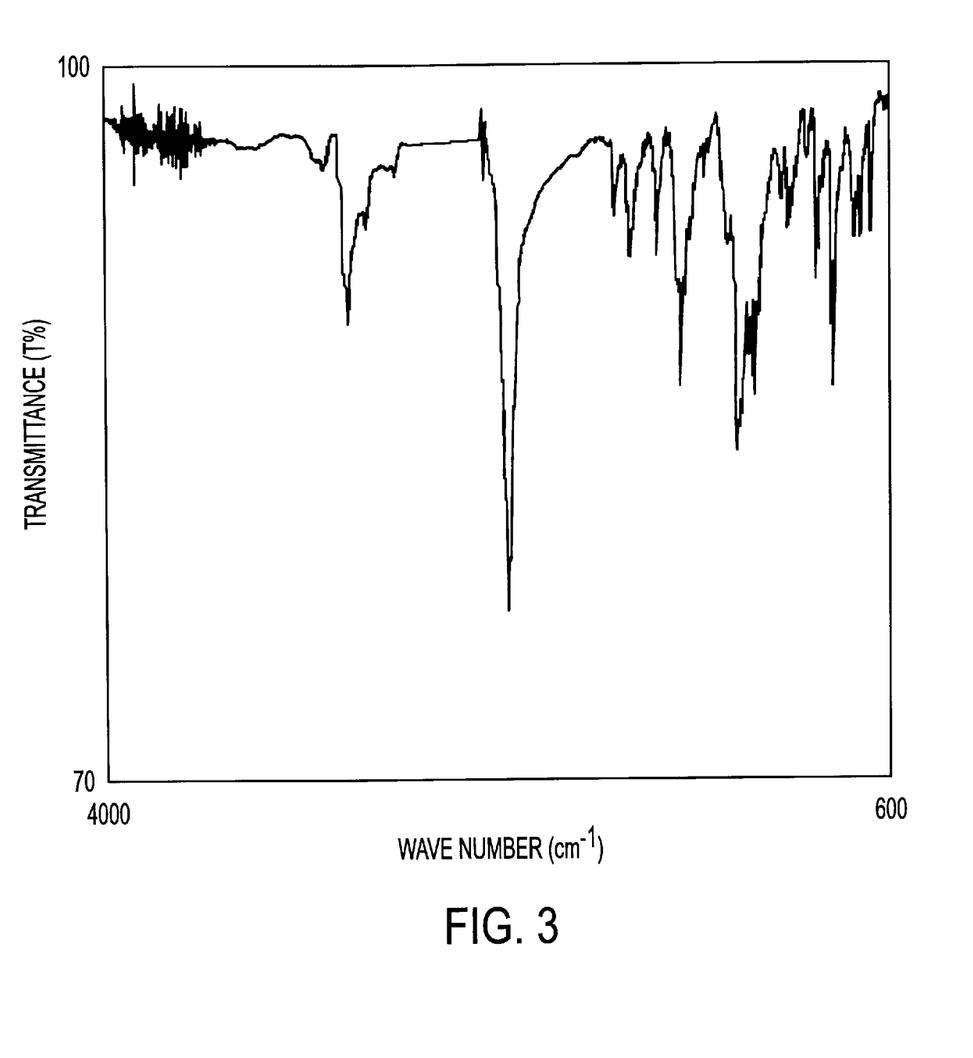
FIG. 3 is a chart illustrating an infrared absorption spectrum of an aromatic polycarbodiimide obtained in Example 7.

(VII)

was synthesized in the same manner as in Example 1 except that in place of 3,3,4,4,5,5,6,6,7,7,8,8,9,9,10,10,10-heptadecafluorodecyl alcohol, cyclohexyl alcohol was used. Using this diamine, polycarbodiimide was synthesized in the same manner as in Example 5 in a yield of 70%. The polycarbodiimide showed an IR spectrum as illustrated in FIG. 3. The polycarbodiimide had a number average molecular weight (Mn) of 1,430 (n=7) and a dielectric constant at 1 MHz of 2.82.

Example 8

A diamine represented by the formula (VIII)

Figure 4:
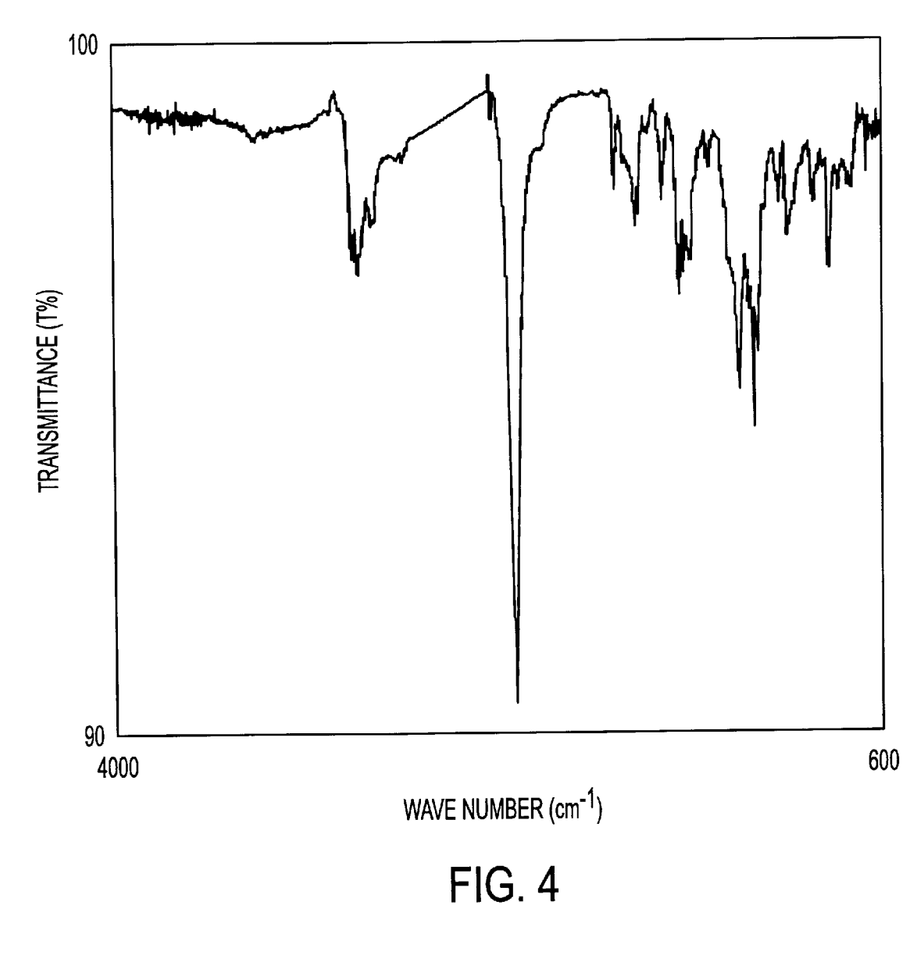
FIG. 4 is a chart illustrating an infrared absorption spectrum of an aromatic polycarbodiimide obtained in Example 8.

(VIII)

was synthesized in the same manner as in Example 1 except that in place of 3,3,4,4,5,5,6,6,7,7,8,8,9,9,10,10,10-heptadecafluorodecyl alcohol, 2-ethylhexyl alcohol was used. Using this diamine, polycarbodiimide was synthesized in the same manner as in Example 5 in a yield of 84%. The polycarbodiimide showed an IR spectrum as illustrated in FIG. 4. The solution of the polycarbodiimide was cast on a glass plate and dried at 200° C. for 30 minutes to obtain a 15 μm-thick film with Tg=113° C. The polycarbodiimide had a number average molecular weight (Mn) of 2,230 (n=10) and a dielectric constant at 1 MHz of 3.06.

Comparative Example 2

The film produced in Comparative Example 1 was measured for contact angle and water absorption. The properties measured are shown in Table 2.

Comparative Example 3

In an Erlenmeyer flask were charged pyromellitic dianhydride (2.18 g, 10.0 mmol) and 50 g of 4,4'-oxydianiline and N-methylpyrrolidone (NMP). The mixture was stirred at room temperature for 3 days under nitrogen atmosphere to obtain an NMP solution of polyamide acid. Then, this varnish was cast on a glass plate and cured at 150° C. for 1 hour, 200° C. for 30 minutes, 250° C. for 30 minutes and further 360° C. for 15 minutes to obtain a film with Tg=420° C. and Td=550° C. This film was measured for contact angle and water absorption. Confirming an IR spectrum of this film, absorptions at 1,740 cm$^{-1}$ and 1,790 cm$^{-1}$, specific to an imide group were observed. The properties are shown in Table 2.

TABLE 2

| | Example 5 | Example 6 | Comparative Example 2 | Comparative Example 3 |
|---|---|---|---|---|
| Contact angle for water (°) | 105.5 | 101.2 | 87.5 | 74.4 |
| Water absorption (%) | 0.1 | 0.1 | 0.5 | 2.9 |
| Flexibility* | ○ | ○ | x | ○ |

*Flexibility: After heat treatment at 250° C. for 1 hour

The polycarbodiimide of the present invention has good processability and excellent properties of heat resistance, moisture resistance, and low dielectric constant. In particular, polycarbodiimide having as a side chain a long chain alkyl ether group or a long chain fluorinated alkyl ether group has low elastic modulus and is excellent in adhesion so that it can be used as a heat resistant coating material in a soldering step in the production of electronic parts. Since the polycarbodiimide of the present invention itself has excellent water repellency that the conventional polycarbodiimides fail to have, it is very useful as a protective material or a releasing material for electronic parts and optical parts.

The present invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An aromatic polycarbodiimide comprising a structure represented by the following formula (I):

(I)

wherein n is an integer of 2 to 300, and R represents an aliphatic group having 3 to 20 carbon atoms or a fluorinated aliphatic group.

2. The aromatic polycarbodiimide of claim 1, wherein R represents a saturated aliphatic group having 3 to 20 carbon atoms or a fluorinated saturated aliphatic group.

3. The aromatic polycarbodiimide of claim 1, wherein R represents an alkyl group having 3 to 20 carbon atoms or a fluorinated alkyl group.

4. The aromatic polycarbodiimide of claim 1, wherein n is an integer of 4 to 100.

5. A polycarbodiimide solution prepared by dissolving the aromatic polycarbodiimide according to claim 1 in an organic solvent.

6. A water repellent polycarbodiimide sheet, comprising as a main ingredient the aromatic polycarbodiimide according to claim 1.

7. A water repellent sheet comprising a substance having on at least one surface thereof a water repellent sheet comprising as a main ingredient the aromatic polycarbodiimide comprising a structure represented by the following formula (I):

(I)

wherein n is an integer of 2 to 300, and R represents an organic group.

8. A water repellent sheet according to claim 7, wherein the substance is a sheet or film substance.

9. A water repellent sheet according to claim 7, wherein the substance is a metal foil or a resin.

10. A water repellent sheet according to claim 8, wherein the substance is a metal foil or a resin.

11. An aromatic polycarbodiimide comprising a structure represented by the following formula (I):

(I)

wherein n is an integer of 4 to 100, and R represents an organic group.

12. A water repellent polycarbodiimide sheet, comprising as a main ingredient the aromatic polycarbodiimide according to claim 11.

13. A water repellent sheet according to claim 7, wherein R represents an aliphatic group having 3 to 20 carbon atoms or a fluorinated aliphatic group.

14. The aromatic polycarbodiimide of claim 11, wherein R represents an aliphatic group having 3 to 20 carbon atoms or a fluorinated aliphatic group.

* * * * *